United States Patent
Song et al.

(10) Patent No.: US 12,294,097 B2
(45) Date of Patent: May 6, 2025

(54) PRIMER LAYER COMPOSITION, SECONDARY BATTERY POUCH FILM USING THE SAME, AND METHOD OF MANUFACTURING THE SAME

(71) Applicant: Youlchon Chemical Co., Ltd., Seoul (KR)

(72) Inventors: Nok Jung Song, Seoul (KR); Han Chul Park, Gyeonggi-do (KR); Hee Sik Han, Gyeonggi-do (KR); Ji Min Lee, Gyeonggi-do (KR)

(73) Assignee: Youlchon Chemical Co., Ltd., Seoul (KR)

( * ) Notice: Subject to any disclaimer, the term of this patent is extended or adjusted under 35 U.S.C. 154(b) by 0 days.

(21) Appl. No.: 18/387,759

(22) Filed: Nov. 7, 2023

(65) Prior Publication Data
US 2024/0079697 A1 Mar. 7, 2024

Related U.S. Application Data

(63) Continuation of application No. 17/083,637, filed on Oct. 29, 2020, now Pat. No. 11,916,241.

(30) Foreign Application Priority Data

Sep. 4, 2020 (KR) .................. 10-2020-0113048

(51) Int. Cl.
*H01M 50/183* (2021.01)
*C08K 5/00* (2006.01)
*C08L 23/12* (2006.01)
*H01M 4/04* (2006.01)
*H01M 50/124* (2021.01)

(52) U.S. Cl.
CPC .......... *H01M 50/183* (2021.01); *C08L 23/12* (2013.01); *H01M 4/0407* (2013.01); *H01M 50/124* (2021.01); *C08K 5/0025* (2013.01)

(58) Field of Classification Search
CPC ............. H01M 50/183; H01M 50/124; H01M 4/0407; C08L 23/12; C08K 5/0025
See application file for complete search history.

(56) References Cited

FOREIGN PATENT DOCUMENTS

| CN | 104051678 A | 9/2014 |
|---|---|---|
| CN | 107408642 A | 11/2017 |
| CN | 109844984 A | 6/2019 |
| CN | 111171737 A | 5/2020 |
| JP | 2001246306 A | 9/2001 |

(Continued)

*Primary Examiner* — Sarah A. Slifka
(74) *Attorney, Agent, or Firm* — Winstead PC

(57) ABSTRACT

Disclosed are a method for manufacturing a secondary battery pouch film having at least an outer layer, a metal layer, a primer layer, and a sealant layer, or at least an outer layer, a metal layer, a primer layer, a melt-extrusion resin layer, and a sealant layer in this order, the method including: a drying process of applying and heating a primer layer composition on the metal layer so as to dry the primer layer composition and cure at least a part of the primer layer composition. The organic solvent-based emulsion composition contains acid-modified polypropylene and a curing agent and has a curing start temperature of 150° C. or lower, preferably 135° C. to 150° C., and a drying process temperature of 150° C. or lower, preferably 135° C. to 150° C. The method is not subjected to a thermal lamination process when laminating sealant layer.

9 Claims, 1 Drawing Sheet

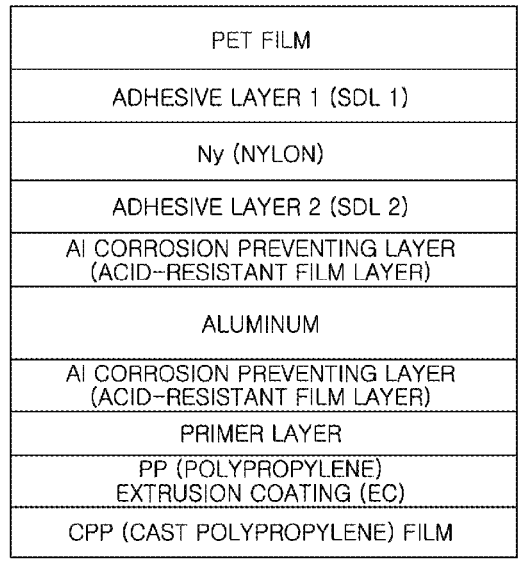

(56) References Cited

FOREIGN PATENT DOCUMENTS

| | | | |
|---|---|---|---|
| JP | 2002298801 | A | 10/2002 |
| JP | 4899235 | B2 | 3/2012 |
| JP | 2012216364 | A | 11/2012 |
| JP | 2013134823 | A | 7/2013 |
| JP | 2013222555 | A | 10/2013 |
| JP | 2017025287 | A | 2/2017 |
| JP | 2017059523 | A | 3/2017 |
| JP | 2017109422 | A | 6/2017 |
| JP | 2017157369 | A | 9/2017 |
| JP | 2017213804 | A | 12/2017 |
| JP | 2018067476 | A | 4/2018 |
| JP | 2018111808 | A | 7/2018 |
| JP | 2019029220 | A | 2/2019 |
| JP | 2019112611 | A | 7/2019 |
| WO | 2012050182 | A1 | 4/2012 |
| WO | 2014069236 | A | 5/2014 |
| WO | 2015030144 | A1 | 3/2015 |
| WO | 2017030024 | A1 | 2/2017 |
| WO | 2017221801 | A1 | 12/2017 |
| WO | 2018164230 | A1 | 9/2018 |
| WO | 2019027052 | A1 | 2/2019 |
| WO | 2019188283 | A1 | 10/2019 |

| |
|---|
| PET FILM |
| ADHESIVE LAYER 1 (SDL 1) |
| Ny (NYLON) |
| ADHESIVE LAYER 2 (SDL 2) |
| Al CORROSION PREVENTING LAYER (ACID-RESISTANT FILM LAYER) |
| ALUMINUM |
| Al CORROSION PREVENTING LAYER (ACID-RESISTANT FILM LAYER) |
| PRIMER LAYER |
| PP (POLYPROPYLENE) EXTRUSION COATING (EC) |
| CPP (CAST POLYPROPYLENE) FILM |

PRIMER LAYER COMPOSITION, SECONDARY BATTERY POUCH FILM USING THE SAME, AND METHOD OF MANUFACTURING THE SAME

CROSS-REFERENCE TO RELATED APPLICATION

This application is a continuation of U.S. application Ser. No. 17/083,637 filed on Oct. 29, 2020, which claims priority to KR 10-2020-01133048 filed on Sep. 4, 2020, and is incorporated by reference as if fully set forth herein.

BACKGROUND

Field

The present invention relates to a primer layer composition, a secondary battery pouch film using the same, and a method for manufacturing the same. More specifically, the invention relates to a primer layer composition, a secondary battery pouch film using the same, and a method for manufacturing the same, the primer layer composition having improved formability in particular, as well as initial peel strength, hydrofluoric acid resistance, electrolyte resistance, etc.

Description of the Related Art

A lithium secondary battery (LiB) has been applied to many fields based on various advantages such as a high energy density, a good output, etc.

A secondary battery pouch is an exterior member enclosing an electrode group and an electrolyte of the secondary battery and thus has to meet demanded properties of adhesive strength between layers made of a metal thin film and polymer, thermal fusion strength, electrolyte resistance, airtightness, moisture permeability, formability, etc.

The secondary battery pouch is configured to mainly have an outer layer, a barrier layer, and a sealant layer as an inner layer. In general, the outer layer or the outermost layer is made of nylon, a mixed material of nylon and polyethylene terephthalate (PET), oriented polypropylene (OPP), polyethylene, or the like. The demanded properties of the outer layer or the outermost layer include heat resistance, pinhole resistance, chemical resistance, formability, insulation, etc.

The barrier layer is demanded to have formability and barrier property against water vapor or other gases. In this respect, the barrier layer is made of a formable metal such as aluminum (Al), iron (Fe), copper (Cu), or nickel (Ni), and aluminum is most used currently.

The sealant layer of the inner layer is demanded to have an electrolyte resistance, insulation resistance, etc. in that the sealant layer is in contact with an electrolyte, as well as thermal adhesiveness and formability.

Application fields of a lithium ion battery is extended from a small-sized field to a medium-sized and large-sized field such as the automobile field and thus it is demanded to have properties of hydrofluoric acid resistance, electrolyte resistance, formability, or the like suitable for the medium-sized and large-sized field.

SUMMARY

In exemplary embodiments of the invention, an aspect thereof provides a primer layer composition, a secondary battery pouch film using the same, and a method for manufacturing the same, the primer layer composition having good formability in particular, as well as good initial peel strength, hydrofluoric acid resistance, electrolyte resistance, etc.

According to exemplary embodiments of the invention, there is provided a method for manufacturing a secondary battery pouch film having at least an outer layer, a metal layer, a primer layer, and a sealant layer, or at least an outer layer, a metal layer, a primer layer, a melt-extrusion resin layer, and a sealant layer in this order, the method including: a drying process of applying a primer layer composition on the metal layer and heating to dry the primer layer composition and cure at least a part of the primer layer composition. As the primer layer, an organic solvent-based emulsion composition is used. The organic solvent-based emulsion composition contains acid-modified polypropylene and a curing agent and has a curing start temperature of 150° C. or lower, preferably 135° C. to 150° C., and a drying process temperature of 150° C. or lower, preferably 135° C. to 150° C. When laminating the sealant layer after the drying process, the method is not subject to a thermal lamination process.

According to exemplary embodiments of the invention, there is provided a method for improving formability of a secondary battery pouch film having at least an outer layer, a metal layer, a primer layer, and a sealant layer, or at least an outer layer, a metal layer, a primer layer, a melt-extrusion resin layer, and a sealant layer in this order, the method including: a drying process of applying a primer layer composition on the metal layer and heating to dry the primer layer composition and cure at least a part of the primer layer composition. As the primer layer, an organic solvent-based emulsion composition is used. The organic solvent-based emulsion composition contains acid-modified polypropylene and a curing agent and has a curing start temperature of 150° C. or lower, preferably 135° C. to 150° C., and a drying process temperature of 150° C. or lower, preferably 135° C. to 150° C. When laminating the sealant layer after the drying process, the method is not subject to a thermal lamination process.

In addition, according to exemplary embodiments of the invention, there is provided a primer layer composition that is used in the method for manufacturing a secondary battery pouch film and is located between a metal layer and a melt-extrusion resin layer or a sealant layer of the secondary battery pouch film, the primer layer composition being formed of an organic solvent-based emulsion composition. The organic solvent-based emulsion composition contains acid-modified polypropylene and a curing agent and has a curing start temperature of 150° C. or lower, preferably 135° C. to 150° C., and a drying process temperature of 150° C. or lower, preferably 135° C. to 150° C.

In addition, according to exemplary embodiments of the invention, there is provided a secondary battery pouch film including a primer layer that is located between a metal layer and a melt-extrusion resin layer or a sealant layer, the primer layer being formed of an organic solvent-based emulsion composition. The organic solvent-based emulsion composition contains acid-modified polypropylene and a curing agent and has a curing start temperature of 150° C. or lower, preferably 135° C. to 150° C., and a drying process temperature of 150° C. or lower, preferably 135° C. to 150° C.

In addition, according to exemplary embodiments of the invention, there is provided a secondary battery pouch film including a primer layer that is sandwiched between a metal layer and a melt-extrusion resin layer or a sealant layer. Formability of the secondary battery pouch film is 6.5 mm or larger. Initial peel strength thereof is 14.0 N/mm or higher. Hydrofluoric acid resistance strength thereof is 5.0 N/mm or higher. Electrolyte resistance strength thereof is equal to or higher than 90% of the initial peel strength.

BRIEF DESCRIPTION OF THE DRAWINGS

FIG. 1 is a schematic diagram illustrating a structure of a secondary pouch film according to an exemplary embodiment of the invention.

DETAILED DESCRIPTION

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose exemplary embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Definition of Terms

In the present disclosure, when the specification describes that layers of a secondary battery pouch film are included in order, it is not necessary for the secondary battery pouch film to be configured of the corresponding layers, but an additional layer may be included in the secondary battery pouch film.

In the present disclosure, being formed on a metal layer refers to not only being formed directly on the metal layer but also being formed on the metal layer after interposing another layer such as a corrosion preventing layer.

In the present disclosure, a curing start temperature refers to a temperature at which a curing reaction starts.

In the present disclosure, a drying process refers to a process of evaporating a liquid used as a solvent of an emulsion composition of a primer layer and promoting a curing reaction of the emulsion composition of a primer layer. Since the drying process is performed before a lamination of the sealant layer, it is distinguished from the thermal lamination process.

In the present disclosure, a drying process temperature refers to a maximum set temperature among temperatures in a process of evaporating a liquid used as a solvent of an emulsion composition of a primer layer and promoting a curing reaction of the emulsion composition of a primer layer.

In the present disclosure, a thermal lamination process refers to a process of performing lamination by applying heat in order to further promote a curing reaction of the emulsion composition of a primer layer when laminating with a sealant layer after forming a primer layer on a metal layer or when laminating with a sealant layer after forming a primer layer and a melt-extrusion resin layer on a metal layer.

In the present disclosure, not performing a thermal lamination when laminating with a sealant layer refers to laminating with the sealant layer by applying only pressure without heat.

In the present disclosure, formability means a forming depth in which ten or more samples of secondary battery pouch film are not broken when forming the samples by using a die. The formability is evaluated as good when the forming depth is 6.5 mm or more.

In the present disclosure, a method for improving formability of a secondary battery pouch film means a method for improving a formability to reach 6.5 mm or more while properties of initial peel strength, hydrofluoric acid resistance, electrolyte resistance, etc. are equal to or higher than a demanded level.

It is appropriate that the electrolyte resistance strength is equal to or higher than 90% of the initial peel strength, and the hydrofluoric acid resistance strength is equal to or higher than 5 N/15 mm. Since the electrolyte resistance strength and the hydrofluoric acid resistance strength are much affected by the initial peel strength, it is appropriate that the initial peel strength is equal to or higher than 14 N/15 mm.

DESCRIPTION OF EXEMPLARY EMBODIMENTS

Hereinafter, exemplary embodiments of the invention are described in detail.

FIG. 1 is a schematic diagram illustrating a structure of a secondary pouch film according to an exemplary embodiment of the invention.

As illustrated in FIG. 1, a secondary battery pouch film according to the exemplary embodiment of the invention includes at least an outer layer, a metal layer, a primer layer, and a sealant layer in this order, or the secondary battery pouch film includes at least an outer layer, a metal layer, a primer layer, a melt-extrusion resin layer, and a sealant layer in this order.

An organic solvent-based emulsion used in the primer layer is in a liquid state and may be formed on the metal layer through a separate coating process. In the process, two processing steps are generally performed in order to increase adhesiveness and closeness of the metal layer and the sealant layer (or a melt-extrusion resin layer and the sealant layer, when the melt-extrusion resin layer is interposed).

In a first processing step, a drying process of evaporating a liquid used as a solvent of the emulsion and promoting a curing reaction is performed. In a second processing step, a thermal lamination process of performing lamination by applying heat in order to promote the curing reaction of the composition of the primer layer once again when laminating with the sealant layer after forming the primer layer or when laminating with the sealant layer after forming the primer layer and the melt-extrusion resin layer.

In the lamination process, a high temperature is provided directly to the secondary battery pouch film so as to transmit much heat thereto and, thus, is very effective to promote a curing reaction of the emulsion. However, the present inventors found that the lamination process may decrease a slipping property of the sealant layer and thus to decrease the formability due to a direct exposure of the secondary battery pouch film to a high temperature.

In this respect, according to the exemplary embodiments, there is provided a method for manufacturing a secondary battery pouch film or a method for improving formability of a secondary battery pouch film—the secondary battery pouch film includes at least an outer layer, a metal layer, a primer layer, and a sealant layer in this order, or at least an outer layer, a metal layer, a primer layer, a melt-extrusion resin layer, and a sealant layer in this order—in which only a drying process is performed without the thermal lamination process described above. In addition, a composition for the primer layer that is interposed between the metal layer and the melt-extrusion resin or the metal layer and the sealant layer of the secondary battery pouch film is made of a two-component curing-type organic solvent-based emulsion composition containing, for example, acid-modified polypropylene and a curing agent. In addition, a curing start temperature and a drying process temperature are adjusted. Accordingly, particularly excellent formability as well as good initial peel strength, hydrofluoric acid resistance, electrolyte resistance, etc. may be achieved.

First, the organic solvent-based emulsion composition is explained. An emulsion may be classified into a water-based emulsion and an organic solvent-based emulsion. The case of using water as a solvent for an emulsion containing, for example, acid-modified polypropylene, various types of polymers, etc. is referred to as the water-based emulsion type, and the case of using an organic solvent (cyclohexane (CH), ethyl acetate (EA), toluene (TOL), or the like) as the solvent is referred to as organic solvent-based emulsion type.

In the exemplary embodiments of the invention, as the primer layer, an organic solvent-based emulsion composition, preferably a two-component curing-type organic solvent-based emulsion composition is used. For example, the two-component curing type is made of a first solution (major part) where, for example, acid-modified polypropylene is dissolved in an organic solvent and a second solution (curing agent part) where a curing agent is dissolved in an organic solvent.

The two-component curing-type organic solvent-based emulsions are mixed and used for adhesion between the metal layer and the sealant layer or, preferably, between the melt-extrusion polypropylene layer and the metal layer.

When the organic solvent-based emulsion layer, preferably a two-component curing-type organic solvent-based emulsion layer, is formed between the metal layer and the sealant layer or, preferably, between the melt-extrusion polypropylene layer and the metal layer, and drying and curing thereof are adjusted, not only it is possible to provide the adhesive strength between the metal layer and the sealant layer at the inner side of the secondary battery pouch film and improve the hydrofluoric acid resistance and the electrolyte resistance, but also it is possible to increase the formability as described above.

For reference, when the primer layer is formed using the water-based emulsion, it is possible to set a relatively low process temperature (at about 100° C.); however, the water-based emulsion has a drawback of being vulnerable in terms of the hydrofluoric acid resistance. On the other hand, the organic solvent-based emulsion has very good hydrofluoric acid resistance. However, a high process temperature (150° C. or higher) has to be set to promote a reaction in the emulsion or has to perform a separate thermal lamination process. The more the process temperature is increased, the more disadvantageous in that the slipping property is decreased at the sealant layer and the outer layer, which leads to a decrease of the formability.

In an exemplary embodiment, the two-component curing type may be classified depending on types of curing agents, and various types of curing agents such as amine-based curing agent, acid anhydride-based curing agent, polyamide-based curing agent, etc. may be used.

In an exemplary embodiment, the acid-modified polypropylene may be one modified with various acid anhydrides such as acetic anhydride, glutaric anhydride, benzoic anhydride, phthalic anhydride, or maleic anhydride.

In an exemplary embodiment, the curing agent may be an epoxy, acrylic, or urethane curing agent, and preferably using two-component curing type using the epoxy curing agent may lead to improvement of the electrolyte resistance and the hydrofluoric acid resistance.

For example, an epoxy-based two-component curing type may cause a curing reaction, for example, with a carboxylic acid and an acid anhydride, and the curing reaction may result in adhesion between the metal layer and the sealant layer. For reference, a curing reaction of the acid anhydride and the epoxy curing agent may start generally at a high temperature of 200° C. or higher (that is, the curing start temperature is 200° C.). Due to the high start temperature, the start temperature has to be lowered by a catalyst.

In an exemplary embodiment, for example, as the two-component curing-type organic solvent-based emulsion, a first solution (major part) obtained by dissolving a major part material containing acid-modified polypropylene and additives including ammonium salt, 2,5-furandione, or the like in an organic solvent, and a second solution (curing agent part) obtained by dissolving a curing agent material including an epoxy curing agent or an ether polymer (other additives may be further included) in an organic solvent may be used but the two-component curing-type organic solvent-based emulsion is not limited thereto.

For reference, the acid-modified polypropylene in the first solution may serve to improve the adhesive strength with polypropylene of the sealant layer or the melt-extrusion resin layer through a close contact with and adheres to a metal surface, and other additives may serve to improve chemical stability of the emulsion.

Meanwhile, the ether polymer in the second solution may react with the emulsion which is in close contact with the metal surface to cause chemical bonding between the metal surface/emulsion/polypropylene layer (polypropylene layer of the sealant layer or polypropylene layer of the melt-extrusion resin layer), and thus its adhesiveness may be obtained. In addition, the ether polymer may serve to improve stability of the second solution, high temperature stability after the curing reaction, and the hydrofluoric acid resistance. An example of the ether polymer may include bisphenol A diglycidyl ether polymer and may be used as a derivative which derives epoxy bonding.

Meanwhile, in exemplary embodiments, the curing start temperature is 150° C. or lower, preferably 135° C. to 150° C.

The curing start temperature described above results in lowering the drying process temperature, and also results in excellent properties of hydrofluoric acid resistance, electrolyte resistance, formability, etc.

That is, in order for the metal layer and the sealant layer to adhere to each other, a curing reaction of an adhesive constituting the primer layer has to be sufficiently progressed. In addition, as the primer layer plays a very important role of determining the hydrofluoric acid resistance and the electrolyte resistance, it has to have good thermal properties and chemical stability. A thermosetting resin generally satisfies such properties and thus is usually used.

However, in case that the curing start temperature at which the curing reaction starts is high, and the curing reaction is not sufficiently progressed, the adhesiveness is decreased and thus the hydrofluoric acid resistance and the electrolyte resistance are also affected. For this reason, if the high-temperature thermal lamination process described above is carried out, above all, there are demerits of the decrease in the formability of the secondary battery pouch film due to the high-temperature thermal lamination process.

That is, through the high-temperature thermal lamination process, the slipping properties of the outer layer and the sealant layer of the secondary battery pouch film may be decreased, and thus the formability may be decreased. In addition, the high-temperature thermal lamination process may increase hardness of an adhesive layer provided at the outer layer and the primer layer, and to this end, the elasticity of the secondary battery pouch film may decrease, and thus the formability may be decreased.

Therefore, it is advantageous to lower the start temperature such that the curing reaction progresses sufficiently at a low process temperature. In this respect, the curing start temperature is adjusted to be 150° C. or lower, or 135° C. to 150° C.

Here, the start temperature may be adjusted to decrease by adding a catalyst, but it is difficult to decrease the start temperature to a large extent. A catalyst that decreases activation energy to facilitate a chemical reaction does not participate in the reaction, and an increase in the amount of the added catalyst is not proportional to a reduction amount of activation energy. In addition, since the catalyst does not participate in a reaction and remains, physical properties may be badly affected if a large amount of the catalyst is used. Accordingly, there is a limit in lowering the start temperature. Thus, it is difficult to lower the start temperature to 135° C. or lower.

In an exemplary embodiment, as the catalyst that lowers the start temperature and promotes the curing reaction, in general, a tertiary amine (trimethylamine, triethylamine, N,N-dimethylpropylamine, or the like) or imidazole may be usually used. In particular, the tertiary amine serves to promote a reaction of an acid anhydride and epoxy, which improves adhesiveness with metal. The tertiary amine may be generated through a reaction of a secondary amine and epoxy, and the generated tertiary amine in this manner may work as a catalyst.

Meanwhile, the drying process temperature is 100° C. to 150° C., preferably, 135° C. to 150° C. When the drying process temperature is above 150° C., the formability may be decreased as will be described below in the following experimental example.

That is, a high drying process temperature may promote a curing reaction of a two-component curing-type adhesive so as to increase the adhesion strength, but may decrease the slipping property of the outer layer and the sealant layer, and thus the formability may be decreased. Meanwhile, a low drying process temperature may cause an insufficient curing reaction of the two-component curing-type adhesive. To address this issue, if a separate high-temperature thermal lamination process is performed as described above, the slipping property and the formability may be decreased in the process.

In an exemplary embodiment, it is preferable in terms of the formability to set a temperature to be increased or decreased step by step depending on divided drying process zones during the drying process of the emulsion.

For example, it is preferable in terms of the formability that, during the drying process, a zone of the drying process be divided into a plurality of zones, and setting temperatures of zones between a first zone and a last zone be set to be higher than a setting temperature of the first zone and a setting temperature of the last zone.

In a non-limiting example, the zone of the drying process may be divided into the minimum of three zones to the maximum of fifteen zones, a temperature for each zone may be set so as that a temperature of the middlemost zone is set to be the highest temperature. Here, the drying process temperature means the highest temperature among the setting temperatures of the zones.

In an exemplary embodiment, in terms of the formability as well as the initial peel strength, the electrolyte resistance strength, the hydrofluoric acid resistance strength, and the penetration strength, it is most preferable that the curing start temperature described above be 135° C. to 150° C., and the drying process temperature be 135° C. to 150° C.

In an exemplary embodiment, the method for manufacturing a secondary battery pouch film may be subjected to an aging process at room temperature so as to help complete curing of the primer layer emulsion composition when laminating the sealant layer after the drying process.

Meanwhile, according to exemplary embodiments of the invention, there is provided a composition for a primer layer that is used in the method for manufacturing a secondary battery pouch film and is interposed between a metal layer and a melt-extrusion resin layer or a sealant layer, the primer layer composition being formed of an organic solvent-based emulsion composition. The organic solvent-based emulsion composition is a two-component curing type containing acid-modified polypropylene and a curing agent, has 150° C. or lower of the curing start temperature, and is dried at 150° C. or lower.

In addition, according to exemplary embodiments of the invention, there is provided a secondary battery pouch film manufactured by the method for manufacturing a secondary battery pouch film described above, wherein the secondary battery pouch film includes a primer layer that is interposed between a metal layer and a melt-extrusion resin layer or a sealant layer. The formability of the secondary battery pouch film is 6.5 mm or larger. The initial peel strength thereof is 14.0 N/15 mm or higher. The hydrofluoric acid resistance strength thereof is 5.0 N/15 mm or higher. The electrolyte resistance strength thereof is equal to or higher than 90% of the initial peel strength.

In an exemplary embodiment, the initial peel strength thereof may be 14.0 N/15 mm or higher, the electrolyte resistance strength thereof may be 14.0 N/15 mm or higher, the hydrofluoric acid resistance strength thereof may be 5.0 N/15 mm or higher, and the penetration strength thereof may be 21.0 N or higher.

In an exemplary embodiment, the formability of the secondary battery pouch film may be 6.5 mm to 6.8 mm, the initial peel strength thereof may be 14.0 N/15 mm to 15.0 N/15 mm, the electrolyte resistance thereof may be 14.0 N/15 mm to 14.5 N/15 mm, the hydrofluoric acid resistance strength thereof may be 6.0 N/15 mm to 6.4 N/15 mm, and the penetration strength thereof may be 21.0 N to 23.0 N.

In an exemplary embodiment, with reference to FIG. 1 again, the secondary battery pouch film may be configured to particularly have a base layer, a metal layer, a corrosion preventing layer (acid-resistant film layer) formed on at least one side of the metal layer, a primer layer formed on an inner side of the metal layer, a polypropylene extrusion layer which is a melt-extrusion resin layer, and a cast polypropylene (CPP) layer which is a sealant layer.

The base layer may be formed of one or more of a polyester film and a polyimide film and may be configured of, for example, a polyethylene terephthalate (PET) film on the outermost side and a nylon film on the inner side. The PET film and the nylon film may adhere to each other by performing solvent dry lamination (SDL) via a first adhesive layer. In addition, the nylon film and the metal layer may also adhere to each other by performing the solvent dry lamination (SDL) via a second adhesive layer.

The metal layer may be aluminum which is typically used and thus a chromate-based or non-chromate-based aluminum corrosion preventing layer may be formed as a corrosion preventing layer.

The cast polypropylene layer as the sealant layer may be formed to have multiple layers such as three layers.

The exemplary embodiments of the invention will be described in more detail with reference to the following examples. The examples disclosed in this specification are provided only for purpose of the explanation and may be implemented in various forms and should not be construed to limit the invention to the examples described herein.

Experiment 1: Comparative Experiment Depending on Difference in Curing Start Temperature and Drying Process Temperature As illustrated in FIG. 1, when a secondary battery pouch is manufactured, the base layer (PET/nylon) and the Al metal layer formed with the Al corrosion preventing layer are first adhered to each other, and a material, in which the base layer and the metal layer (Al metal layer having the Al corrosion preventing layer) adhered, is made to adhere to the sealant layer (CPP film) in the last process. The secondary battery pouch film is produced by laminating the sealant layer after an emulsion coating and drying process are carried out in order to form the primer layer on the metal layer when the sealant layer adhered. Meanwhile, during lamination of the sealant layer, a layer may be additionally formed as the melt-extrusion resin layer by extruding polypropylene.

As described above, during the drying process of the emulsion, the drying process is subjected to divided zones so as to set a temperature to be increased or decreased step by step, and the zones may be divided into the minimum of three zones to the maximum of fifteen zones and a temperature for each zone may be set. In Experiment 1, the zone is divided into ten zones, for example. The temperature of the middlemost zone is set to be the highest, and the process temperature represents the highest temperature of the setting temperatures.

The two-component type organic solvent-based emulsion applied to the primer layer of the secondary battery pouch film is made based on a bisphenol A-based epoxy type. The bisphenol A-based epoxy type is the most typical one among the epoxy types and is characterized by having good adhesiveness, chemical resistance, and high temperature properties.

The first solution (major part) obtained by dissolving a major part material containing acid-modified polypropylene as described above in an organic solvent and a second solution (curing agent part) obtained by dissolving a curing agent material including an epoxy curing agent and an ether polymer in an organic solvent may be used, but it is not limited thereto.

As described above, as the catalyst that lowers the curing start temperature (hereinafter, start temperature) and promotes the curing reaction, typically, a tertiary amine or imidazole may be used. In Experiment 1, the tertiary amine is used as an example.

Hereinafter, comparative examples and examples are summarized as follows.

(Comparative Example 1) A secondary battery pouch film is produced, after the drying process temperature of the two-component type solvent-based emulsion having a start temperature of 175° C. to 190° C. is set to 100° C.

(Comparative Example 2) A secondary battery pouch film is produced, after the drying process temperature of the two-component type solvent-based emulsion having a start temperature of 175° C. to 190° C. is set to 120° C.

(Comparative Example 3) A secondary battery pouch film is produced, after the drying process temperature of the two-component type solvent-based emulsion having a start temperature of 175° C. to 190° C. is set to 135° C.

(Comparative Example 4) A secondary battery pouch film is produced, after the drying process temperature of the two-component type solvent-based emulsion having a start temperature of 175° C. to 190° C. is set to 150° C.

(Comparative Example 5) A secondary battery pouch film is produced, after the drying process temperature of the two-component type solvent-based emulsion having a start temperature of 175° C. to 190° C. is set to 165° C.

(Comparative Example 6) A secondary battery pouch film is produced, after the drying process temperature of the two-component type solvent-based emulsion having a start temperature of 175° C. to 190° C. is set to 180° C.

(Comparative Example 7) A secondary battery pouch film is produced, after the drying process temperature of the two-component type solvent-based emulsion having a start temperature of 175° C. to 190° C. is set to 200° C.

(Example 1) A secondary battery pouch film is produced, after the process temperature of the two-component type solvent-based emulsion having a start temperature lowered to 135° C. to 150° C. is set to 100° C.

(Example 2) A secondary battery pouch film is produced, after the process temperature of the two-component type solvent-based emulsion having a start temperature lowered to 135° C. to 150° C. is set to 120° C.

(Example 3) A secondary battery pouch film is produced, after the process temperature of the two-component type solvent-based emulsion having a start temperature lowered to 135° C. to 150° C. is set to 135° C.

(Example 4) A secondary battery pouch film is produced, after the process temperature of the two-component type solvent-based emulsion having a start temperature lowered to 135° C. to 150° C. is set to 150° C.

(Comparative Example 8) A secondary battery pouch film is produced, after the process temperature of the two-component type solvent-based emulsion having a start temperature lowered to 135° C. to 150° C. is set to 165° C.

(Comparative Example 9) A secondary battery pouch film is produced, after the process temperature of the two-component type solvent-based emulsion having a start temperature lowered to 135° C. to 150° C. is set to 180° C.

(Comparative Example 10) A secondary battery pouch film is produced, after the process temperature of the two-component type solvent-based emulsion having a start temperature lowered to 135° C. to 150° C. is set to 200° C.

TABLE 1

| No. | Start temperature (° C.) | Drying process temperature (° C.) |
|---|---|---|
| Comparative Example 1 | 175~190 | 100 |
| Comparative Example 2 | | 120 |
| Comparative Example 3 | | 135 |
| Comparative Example 4 | | 150 |
| Comparative Example 5 | | 165 |
| Comparative Example 6 | | 180 |
| Comparative Example 7 | | 200 |
| Example 1 | 135~150 | 100 |
| Example 2 | | 120 |
| Example 3 | | 135 |
| Example 4 | | 150 |
| Comparative Example 8 | | 165 |
| Comparative Example 9 | | 180 |
| Comparative Example 10 | | 200 |

Evaluation of Properties

Evaluation of Initial Peel Strength
 i. An experimental sample is prepared by cutting the secondary battery pouch film to have a size of 1.5 cm by 15 cm in width and length, respectively.
 ii. The metal layer and the sealant layer are peeled off, and the peel strength is measured.

Evaluation of Hydrofluoric Acid Resistance
 i. After the secondary battery pouch film is cut to have a size of 10 cm by 20 cm, two surfaces on both sides thermally adhered to each other.
 ii. A manufacturing solution (electrolyte+water (10,000 ppm (about 1%) of concentration of water in the solution)) is put inside the secondary battery pouch having the two surfaces adhering to each other, thermal adhering is performed, and a pack is manufactured.
 iii. The pack is stored at a high-temperature condition (85° C.) for 24 hours.
 iv. The electrolyte inside the pack is removed, and the sample is prepared (width 1.5 cm and length 15 cm) in the same manner as in the evaluation of initial peel strength.
 v. The peel strength between the metal layer and the sealant layer is measured.

Evaluation of Electrolyte Resistance
 i. An experimental sample is prepared by cutting the secondary battery pouch film to have a size of 1.5 cm by 15 cm in width and length, respectively.
 ii. The prepared sample is impregnated with a standard electrolyte (1.0 M LiPF6(EC/DEC/EMC: 1/1/1)) and is stored at a high temperature condition (85° C.) for 24 hours.
 iii. After the electrolyte is washed off, the metal layer and the sealant layer are peeled off, and the peel strength is measured.

Evaluation of Formability
 i. A sample is prepared by cutting the produced secondary battery pouch film to have a size of 15 cm by 15 cm.
 ii. The prepared samples are formed by using a test die (size of 3 cm×4 cm) manufactured by Youlchon Chemical, Co., Ltd.
 iii. Evaluation of formability is repeatedly performed by changing the setting of the forming depth and is performed until ten or more samples are not broken.
 iv. A forming depth, in ten or more samples are not broken, is measured.

Evaluation of Penetration Strength
 i. A sample having a width of 35 mm and a length of 600 mm is produced from the secondary battery pouch film
 ii. The penetration strength is measured at intervals of about 40 mm in a direction from the outer layer toward the inner layer.
 iii. After the strength is measured ten times, an average value thereof is recorded.

In this case, the higher the formability, a forming process range may be wider during manufacturing of a battery. It is appropriate that the electrolyte resistance strength is equal to or higher than 90% of the initial peel strength, and the hydrofluoric acid resistance strength should be equal to or higher than 5 N/15 mm. Since the electrolyte resistance strength and the hydrofluoric acid resistance strength are much affected by the initial peel strength, it is appropriate that the initial peel strength is equal to or higher than 14 N/15 mm.

Table 2 shows evaluation of physical properties based on the curing start temperature and the drying process temperature.

TABLE 2

| No. | Start temperature (° C.) | Drying process temperature (° C.) | Initial peel strength (N/15 mm) | Electrolyte resistance strength (N/15 mm) | Hydrofluoric acid resistance strength (N/15 mm) | Penetration strength (N) | Formability (mm) |
|---|---|---|---|---|---|---|---|
| Comparative Example 1 | 175~190 | 100 | 2 | Peeling | Peeling | 18.4 | 6.5 |
| Comparative Example 2 | | 120 | 2.3 | Peeling | Peeling | 19.2 | 6.6 |
| Comparative Example 3 | | 135 | 2.2 | Peeling | Peeling | 19.3 | 6.6 |
| Comparative Example 4 | | 150 | 6.4 | Peeling | Peeling | 19.3 | 6.5 |

TABLE 2-continued

| No. | Start temperature (° C.) | Drying process temperature (° C.) | Initial peel strength (N/15 mm) | Electrolyte resistance strength (N/15 mm) | Hydrofluoric acid resistance strength (N/15 mm) | Penetration strength (N) | Formability (mm) |
|---|---|---|---|---|---|---|---|
| Comparative Example 5 | | 165 | 14.5 | 14.1 | 5.8 | 24.2 | 6.3 |
| Comparative Example 6 | | 180 | 14.8 | 14.3 | 5.7 | 24.6 | 6.1 |
| Comparative Example 7 | | 200 | 15.6 | 14.8 | 5.8 | 24.5 | 6.1 |
| Example 1 | 135~150 | 100 | 9.2 | 8.1 | 3.9 | 19.4 | 6.8 |
| Example 2 | | 120 | 12.4 | 11.6 | 4.3 | 20.2 | 6.7 |
| Example 3 | | 135 | 14.6 | 14.2 | 6.2 | 21.8 | 6.7 |
| Example 4 | | 150 | 15.0 | 14.3 | 6.4 | 22.3 | 6.8 |
| Comparative Example 8 | | 165 | 15.1 | 14.8 | 6.4 | 23.8 | 6.3 |
| Comparative Example 9 | | 180 | 15.7 | 15.1 | 6.2 | 24.2 | 6.1 |
| Comparative Example 10 | | 200 | 16.1 | 15.4 | 6.5 | 24.7 | 6.0 |

As known from the above, when an emulsion having a start temperature of 175° C. to 190° C. (Comparative Examples 1, 2, 3, and 4) is applied, the initial peel strength is relatively very low to be 10 N or lower when the drying process temperature is 150° C. or lower. The low initial peel strength resulted in a phenomenon where the sealant layer and the metal layer are completely separated from each other during evaluation of the electrolyte resistance strength and the hydrofluoric acid resistance strength.

When the drying process temperature is 165° C. to 200° C. (Comparative Examples 5, 6, and 7), the initial peel strength, the electrolyte resistance strength, and the hydrofluoric acid resistance strength are all good. However, the penetration strength increased to 24 N or higher. As well, a result that the formability does not reach 6.5 mm is obtained.

When the emulsion having a start temperature lowered to 135° C. to 150° C. is applied, the initial peel strength is 10 N/15 mm or lower only when the drying process temperature is 100° C. (Example 1), and the initial peel strength is 12 N/15 mm or higher in a drying process condition of 120° C. or higher (Examples and Comparative Examples 8 to 10). It is confirmed that a decrease in start temperature improves the adhesiveness even at a low drying process temperature.

However, the hydrofluoric acid resistance strength does not reach 5 N/15 mm in the 120° C. condition (Example 2), and the initial peel strength, the electrolyte resistance strength, and the hydrofluoric acid resistance strength are all good in conditions of 135° C. or higher (Examples 3 and 4 and Comparative Examples 8 to 10).

Similar to Comparative Examples 1 to 7, results of an increase in penetration strength in a condition of 165° C. to 200° C. (Comparative Examples 8, 9, 10) and the result of formability smaller than 6.5 mm is obtained.

The penetration strength increased to 20 N or higher at a condition of 135° C. to 150° C. (Examples 3 and 4), but has the best of the formability of 6.5 mm or more.

Therefore, only in a drying process temperature condition corresponding to the start temperature, all the properties of the initial peel strength, the electrolyte resistance strength, the hydrofluoric acid resistance strength are appropriate. When the drying process temperature is above 150° C., and particularly 165° C. or higher as found in an experiment, the penetration strength of the secondary battery pouch film significantly increases, and thus the formability decreases.

Therefore, in order to appropriately obtain all the physical properties, it is preferable to lower the drying process temperature to 150° C. or below, and to this end, it is preferable to lower the start temperature of the solvent-based emulsion to 150° C. or below.

According to the exemplary embodiments of the invention, when the secondary battery pouch film is manufactured, the primer layer composition that is interposed between the metal layer and the melt-extrusion resin layer or the sealant layer is made of a two-component curing-type organic solvent-based emulsion composition containing acid-modified polypropylene and a curing agent, wherein the curing start temperature and the drying process temperature are adjusted, and thermal lamination is not performed. Thereby, good formability, as well as good initial peel strength, hydrofluoric acid resistance, electrolyte resistance, etc. may be achieved.

While the present invention has been described with respect to the specific embodiments, it will be apparent to those skilled in the art that various changes and modifications may be made without departing from the spirit and scope of the invention as defined in the following claims.

What is claimed is:

1. A secondary battery pouch film comprising:
   a primer layer that is interposed between a metal layer and a melt-extrusion resin layer or a sealant layer,
   wherein formability of the secondary battery pouch film is 6.5 mm or larger,
   wherein initial peel strength of the secondary battery pouch film is 14.0 N/15 mm or higher.

2. The secondary battery pouch film according to claim 1, wherein hydrofluoric acid resistance strength of the secondary battery pouch film is 5.0 N/15 mm or higher, and
   wherein electrolyte resistance strength of the secondary battery pouch film is equal to or higher than 90% of the initial peel strength.

3. The secondary battery pouch film according to claim 2, wherein the electrolyte resistance strength is 14.0 N/15 mm or higher.

4. The secondary battery pouch film according to claim 2, wherein the formability is 6.5 mm to 6.8 mm,
   wherein the initial peel strength is 14.0 N/15 mm to 15.0 N/15 mm, wherein the electrolyte resistance is 14.0 N/15 mm to 14.5 N/15 mm, wherein the hydrofluoric acid resistance strength is 6.0 N/15 mm to 6.4 N/15 mm.

5. The secondary battery pouch film according to claim 2, wherein penetration strength of the secondary battery pouch film is 21.0 N to 23.0 N.

6. The secondary battery pouch film according to claim 1, wherein the secondary battery pouch film comprises a base layer; the metal layer; the primer layer; the sealant layer, or the melt-extrusion resin layer and the sealant layer; in this order.

7. The secondary battery pouch film according to claim 6, wherein the secondary battery pouch film is configured to have the base layer, the metal layer, a corrosion preventing layer formed on at least one side of the metal layer, the primer layer formed on an inner side of the metal layer, a polypropylene extrusion layer which is the melt-extrusion resin layer, and a cast polypropylene (CPP) layer which is the sealant layer.

8. The secondary battery pouch film according to claim 7, wherein the base layer is at least one of a polyester film and a polyimide film, and wherein the metal layer is made of aluminum.

9. The secondary battery pouch film according to claim 6, wherein the secondary battery pouch film comprises the base layer which comprises a polyester film and a nylon film; a corrosion preventing layer; the metal layer; a corrosion preventing layer; the primer layer; the melt-extrusion resin layer; and the sealant layer; in this order.

* * * * *